United States Patent
Iio et al.

(10) Patent No.: US 10,275,682 B2
(45) Date of Patent: Apr. 30, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Yuichiro Iio, Kawasaki (JP); Yusuke Mitarai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 14/444,939

(22) Filed: Jul. 28, 2014

(65) Prior Publication Data

US 2015/0036935 A1   Feb. 5, 2015

(30) Foreign Application Priority Data

Jul. 31, 2013   (JP) .................................. 2013-159176

(51) Int. Cl.
*G06K 9/62* (2006.01)
*G06K 9/46* (2006.01)
*G06T 7/00* (2017.01)

(52) U.S. Cl.
CPC ......... *G06K 9/6205* (2013.01); *G06K 9/4642* (2013.01); *G06K 9/6282* (2013.01); *G05B 2219/40053* (2013.01); *G06T 7/0004* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 7,177,459 B1* | 2/2007 | Watanabe | ............ | B25J 9/1697 382/151 |
| 7,313,464 B1* | 12/2007 | Perreault | ................ | B25J 9/1666 318/568.1 |
| 2004/0019405 A1* | 1/2004 | Ban | ........................ | B25J 9/1697 700/213 |
| 2004/0133382 A1* | 7/2004 | Ban | ........................ | B25J 9/1641 702/153 |
| 2007/0177790 A1* | 8/2007 | Ban | ........................ | B25J 9/1697 382/153 |
| 2009/0033655 A1* | 2/2009 | Boca | ...................... | B25J 9/1697 345/419 |

(Continued)

FOREIGN PATENT DOCUMENTS

| | | |
|---|---|---|
| JP | 2004-050390 A | 2/2004 |
| JP | 3654042 B2 | 6/2005 |

OTHER PUBLICATIONS

Matsugu, Masakazu, et al. Detection and Pose Estimation of Piled Objects Using Ensemble of Tree Classifiers. INTECH Open Access Publisher, 2012. 15 pages.*

*Primary Examiner* — Ryan P Potts
(74) *Attorney, Agent, or Firm* — Canon USA, Inc., IP Division

(57) ABSTRACT

When there are a plurality of detection candidate objects, to detect a target object that is appropriately visible as a whole, an information processing apparatus calculates detection likelihoods in a plurality of local areas of each of the plurality of detection target candidates, and a detection reliability of each of the detection target candidates based on a distribution of the detection likelihoods.

9 Claims, 13 Drawing Sheets

(56) References Cited

U.S. PATENT DOCUMENTS

| | | | |
|---|---|---|---|
| 2012/0045120 A1* | 2/2012 | Tate | G06K 9/6282 |
| | | | 382/159 |
| 2012/0059517 A1* | 3/2012 | Nomura | B25J 9/1612 |
| | | | 700/259 |
| 2013/0156262 A1* | 6/2013 | Taguchi | G06T 7/75 |
| | | | 382/103 |
| 2014/0017048 A1* | 1/2014 | Mattern | B25J 9/1612 |
| | | | 414/567 |

* cited by examiner

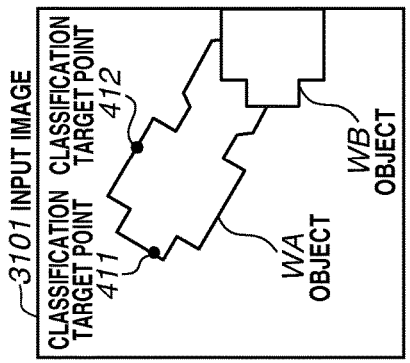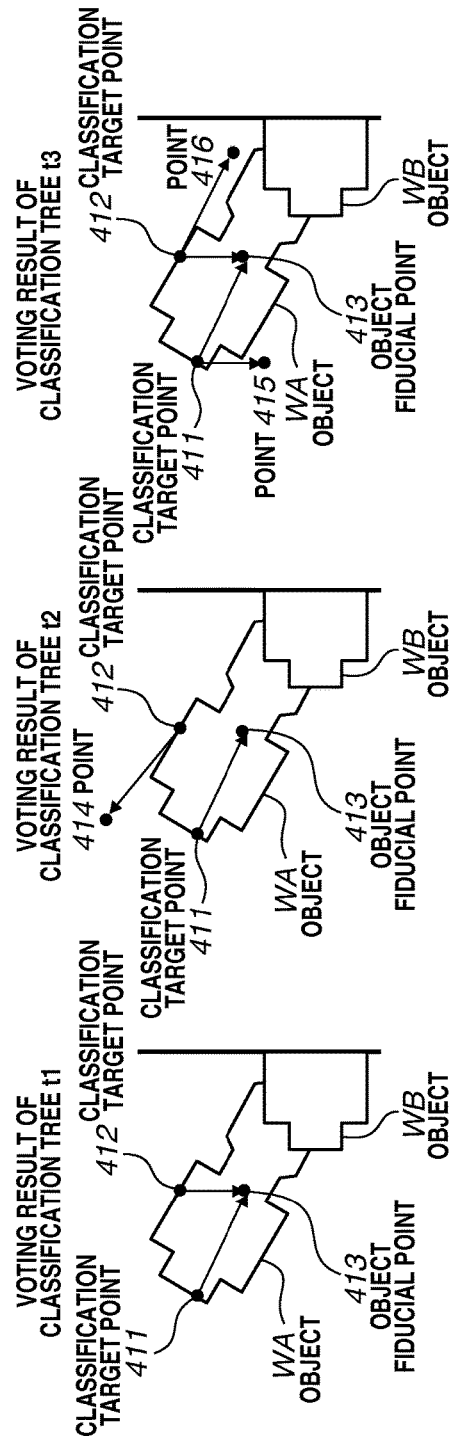

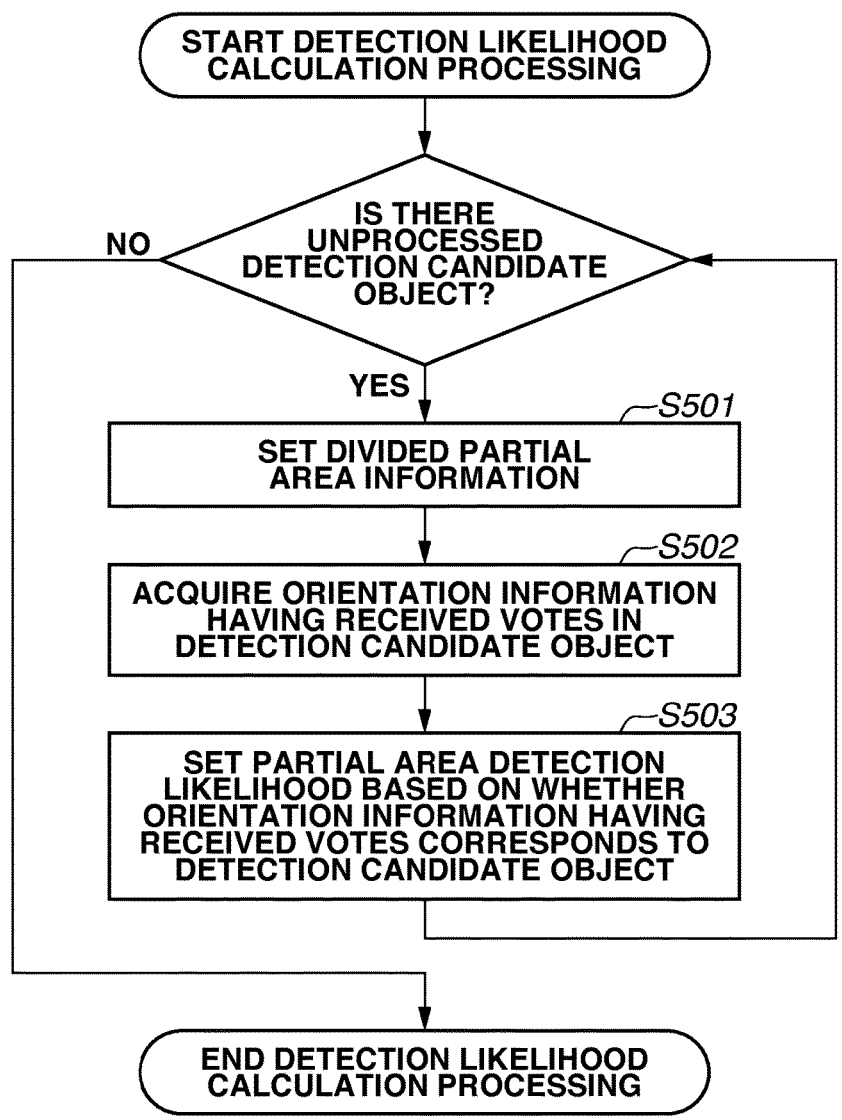

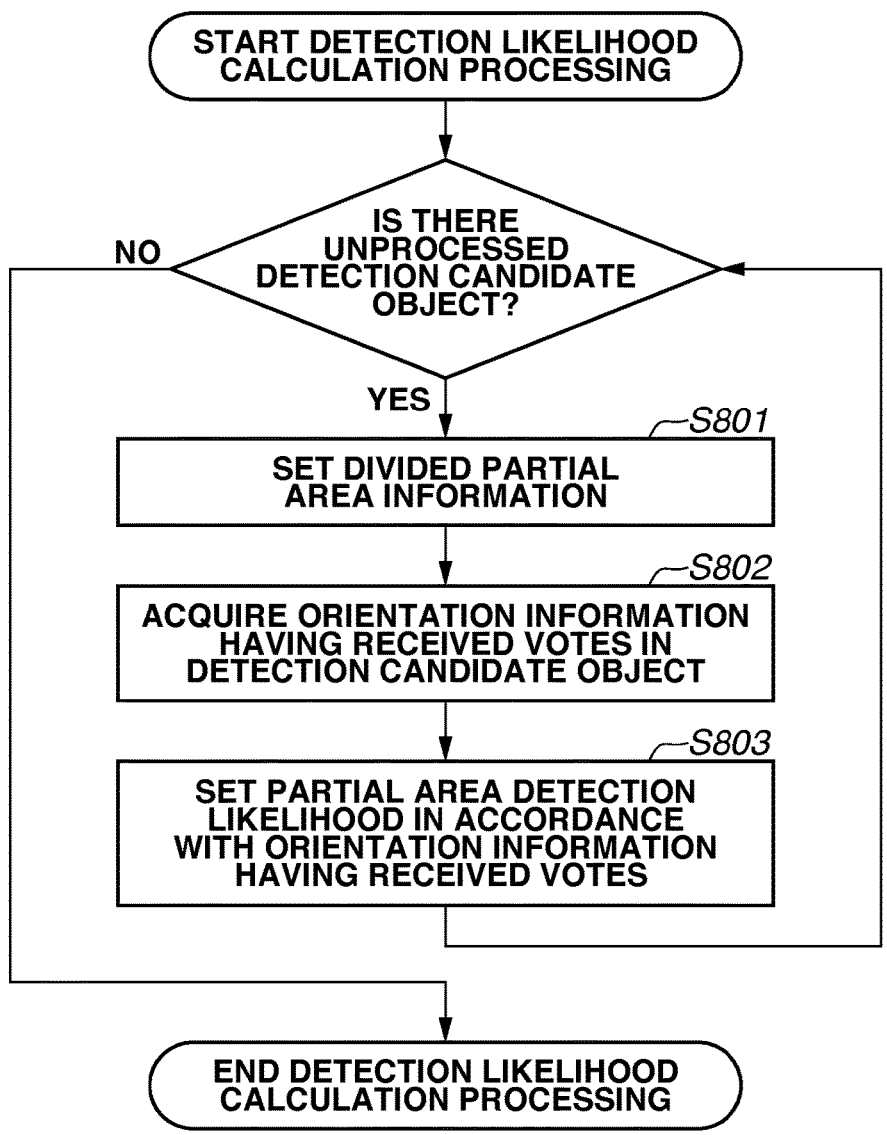

FIG.10A
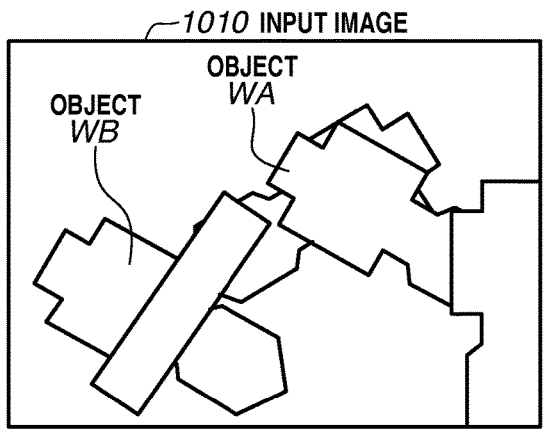
FIG.10B
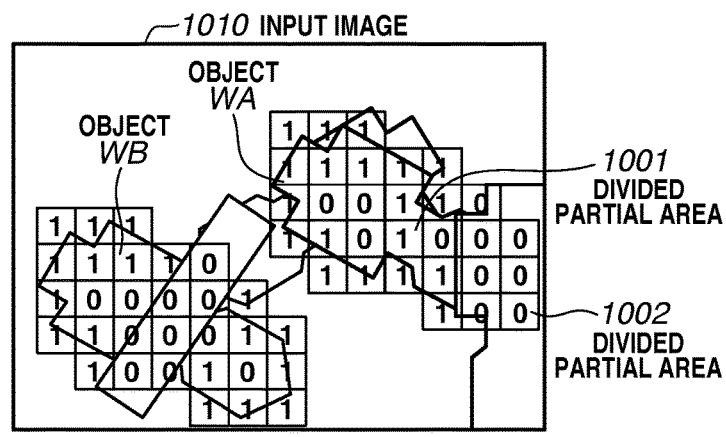
FIG.10C
| | AVERAGE COORDINATE | V_x | V_y | V |
|---|---|---|---|---|
| WA | (-1.00,-0.84) | 0.453 | 0.440 | 0.668 |
| WB | (-0.26,-0.53) | 0.275 | 0.408 | 0.584 |

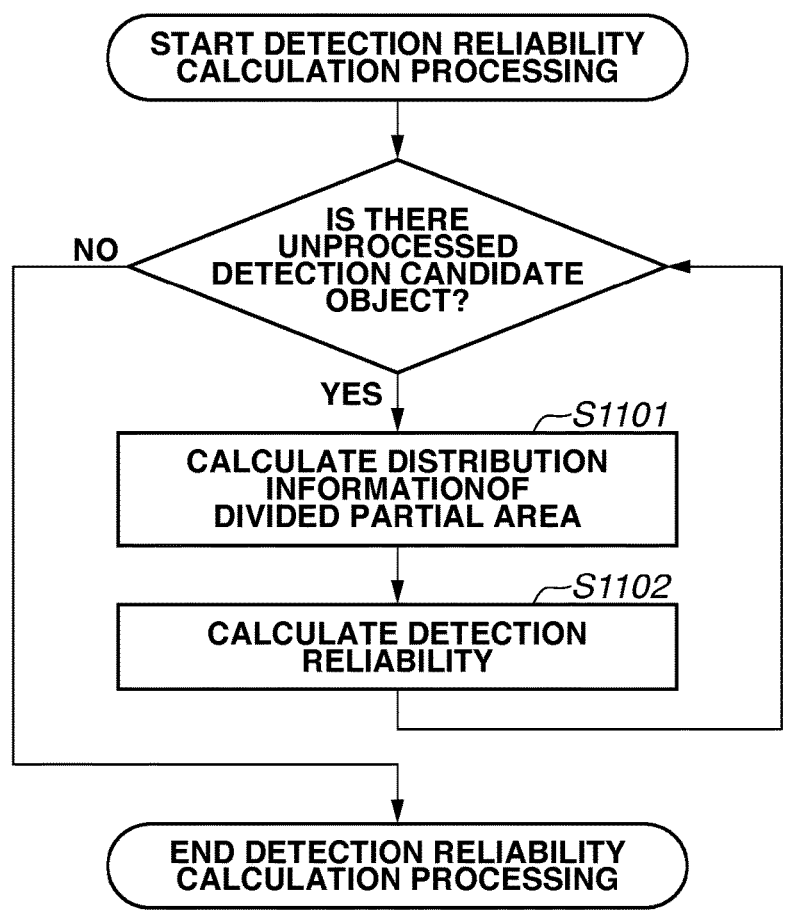

FIG.12A
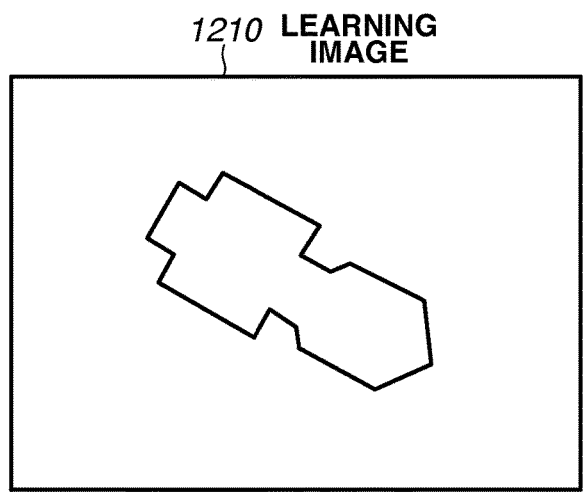
1210 LEARNING IMAGE
FIG.12B
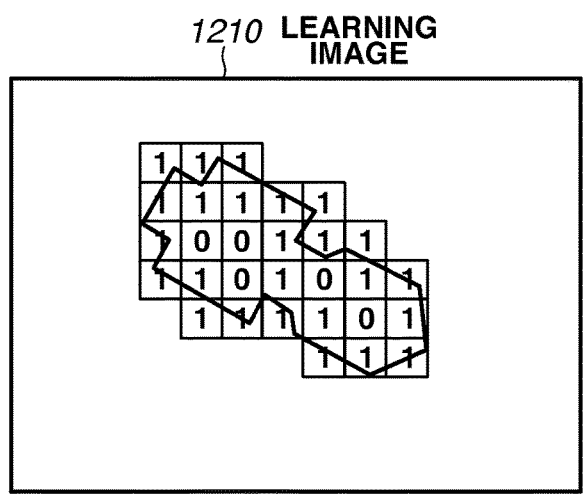
1210 LEARNING IMAGE
FIG.12C
| | AVERAGE COORDINATE | V_x | V_y | V |
|---|---|---|---|---|
| OBJECT IMAGE PREPARED IN ADVANCE | (-0.16,-0.48) | 0.381 | 0.445 | 0.642 |

INFORMATION PROCESSING APPARATUS, INFORMATION PROCESSING METHOD, AND STORAGE MEDIUM

BACKGROUND

Field

Aspects of the present invention generally relate to an information processing apparatus, a method for detecting a target object in an input image, and a storage medium.

Description of the Related Art

Various methods, for detecting a target object in a captured image, have been proposed. In particular, when the image includes a plurality of target objects and one target object detected by detection processing is to be presented, preferably, a candidate of a target object that has a small occluded area and thus is appropriately visible as a whole is presented.

For example, an industrial robot, used for picking objects randomly piled on a tray to achieve automation of a parts supply or an assembly step, picks up an object, and this might cause a group of other pile of objects to collapse.

When a part of the presented target object is out of the image, or inappropriate lighting causes over or under exposure on the image, a position and orientation of the target object is likely detected incorrectly in detection processing. Such a target object is unlikely to be suitable as a picking candidate.

Therefore, when an input image includes a plurality of detection target candidates in position and orientation detection processing for the piled target object in bin picking, preferably, a target object that is appropriately visible as a whole is preferentially selected.

In a method discussed in Japanese Patent Application Laid-Open No. 2004-050390, detection is performed by using entire contour information of an object to identify the position and orientation of the object. Then, a partial area of the object is further detected by using partial contour information. Thus, an object with a small occluded area is preferentially picked up.

In a method discussed in Japanese Patent No. 03654042, reliability of detected position and orientation of each part is obtained. Then, overlapping state is obtained from a positional relationship of the detected position and orientation, and parts are picked up from the one having the highest reliability and being indicated to be at the highest position by the overlapping state.

However, the methods described above have the following problems.

In the method discussed in Japanese Patent Application Laid-Open No. 2004-050390, the priority is determined based only on the occlusion in the set partial area, and this does not necessarily mean that the determination is performed based on the occlusion in the entire object. When one of the set partial areas has a strong feature and the area having a strong feature matches with the set partial area, priority might be set high regardless of whether the partial areas having a weaker feature are occluded. Furthermore, the detection processing needs to be executed for a plurality of times, and thus the calculation cost is high.

In the method discussed in Japanese Patent No. 03654042, the detected candidate objects are all projected onto three dimensional planes, and the overlapping state of the objects is determined, to select an object with a small occluded area. Thus, when some objects are not detected or incorrectly detected, the reliability of the determination on the overlapping state of the correctly detected objects becomes low.

SUMMARY OF THE INVENTION

Aspects of the present invention are generally directed to a technique for selecting an object having a large appropriately visible area as a detection target from a plurality of detection candidate objects in an input image.

According to an aspect of the present invention, information processing apparatus includes an input unit configured to input an image including a plurality of detection candidate objects, an estimation unit configured to estimate an orientation of a detection candidate object, in each of measurement areas set to the plurality of detection candidate objects, an identification unit configured to identify the orientation of the detection candidate object, based on the estimated orientation of the detection candidate object in each of the measurement areas, and a determination unit configured to determine an object to be detected, from among the plurality of detection candidate objects, based on correspondence between the estimated orientation of the detection candidate object in each of the measurement areas and the identified orientation of the detection target object.

Further features of the present disclosure will become apparent from the following description of exemplary embodiments with reference to the attached drawings.

BRIEF DESCRIPTION OF THE DRAWINGS

FIGS. 4A, 4B, and 4C are diagrams and a table illustrating an example of an operation of a candidate object detection unit according to the first exemplary embodiment.

FIG. 5 is a flowchart illustrating detection likelihood calculation processing according to the first exemplary embodiment.

FIG. 8 is a flowchart illustrating detection likelihood calculation processing according to a second exemplary embodiment.

FIGS. 10A, 10B, and 10O are diagrams and a table illustrating an example of an operation for an evaluation of a distributed state according to a third exemplary embodiment.

FIG. 11 is a flowchart illustrating detection likelihood calculation processing according to the third exemplary embodiment.

FIGS. 12A, 12B, and 12C are diagrams and a table illustrating an example of an operation for distribution reference value calculation according to the third exemplary embodiment.

DESCRIPTION OF THE EMBODIMENTS

Various exemplary embodiments will be described in detail below with reference to the drawings.

A first exemplary embodiment will be described. According to the present exemplary embodiment, a picking task for a pile of objects is performed. An information processing apparatus according to the present exemplary embodiment, in an image obtained by capturing a pile of objects, a position and orientation of a target object to be picked up next. A detection candidate object having a large appropriately visible area, among a plurality of objects in the captured image, is presented.

Figure 1:
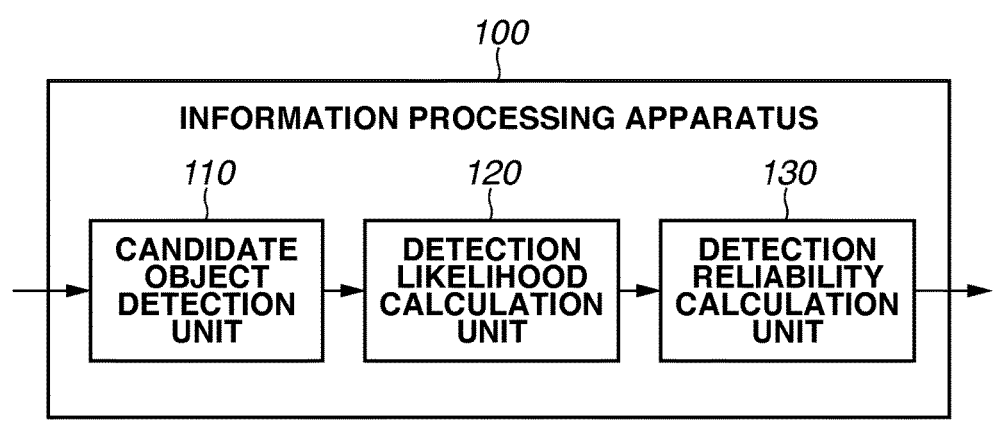
FIG. 1 is a block diagram illustrating a configuration of an information processing apparatus according to a first exemplary embodiment.

FIG. 1 illustrates a configuration of an information processing apparatus 100 (object detection apparatus) according to the present exemplary embodiment. The information processing apparatus 100 according to the present exemplary embodiment includes a candidate object detection unit 110, a detection likelihood calculation unit 120, and a detection reliability calculation unit 130.

Figure 13:
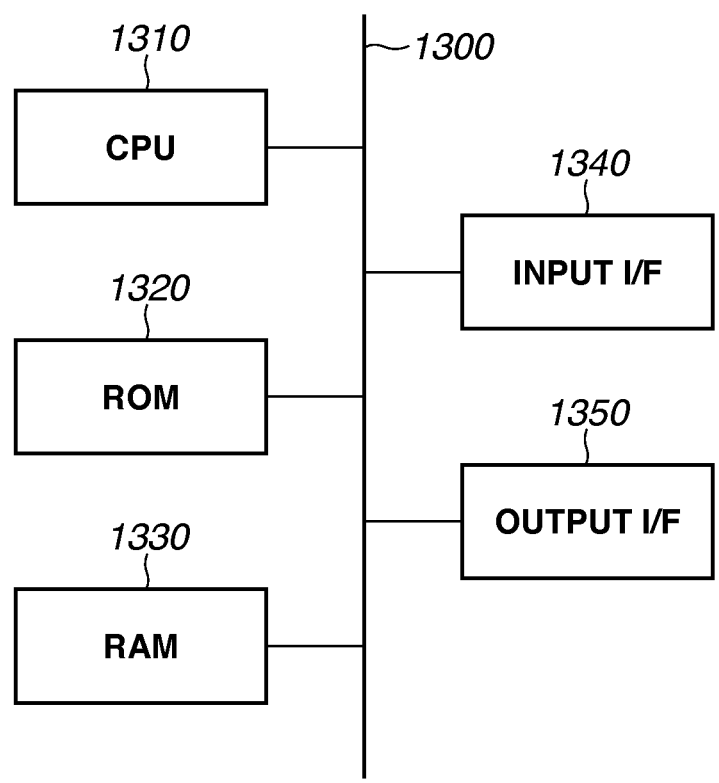
FIG. 13 is a diagram illustrating a hardware configuration of an information processing apparatus according to an exemplary embodiment.

As illustrated in FIG. 13, the information processing apparatus 100 includes a main control unit, such as a central processing unit (CPU) 1310, and storage units, such as a read only memory (ROM) 1320, a random access memory (RAM) 1330, and a hard disk drive (HDD). The information processing apparatus 100 further includes an input unit 1340, such as a keyboard and a mouse, and an output unit 1350, such as a display. The component units are connected with each other through a bus 1300, and are controlled by the main control unit executing a program stored in the storage unit.

The candidate object detection unit 110 detects a plurality of detection candidate objects from an input image of a pile of objects.

The detection likelihood calculation unit 120 calculates detection likelihood of each of the detection candidate objects detected by the candidate object detection unit 110. The detection likelihood is calculated based on information having received votes used in detection processing in a plurality of local areas on the detection candidate object.

The detection reliability calculation unit 130 calculates detection reliability of each detection candidate object, based on a distribution of the detection likelihoods obtained by the detection likelihood calculation unit 120.

A flow of each processing is described below in detail.

The candidate object detection unit 110 detects the plurality of detection candidate objects from the captured image of the pile of objects. According to the present exemplary embodiment, the position and orientation of the detection candidate object are obtained by using Randomized Tree, a conventional technique.

In a learning process of Randomized Tree, two points in a learning image are randomly selected for each node of a classification tree (decision tree), and pixel values of the two points in the learning image are compared. The learning image is then classified into each leaf as a terminal node of the learning tree, based on a result of the comparison. A set of classification trees for classifying learning images is created by creating T classification trees (T is a constant not smaller than 2).

In a detection process, the set of classification trees created in the learning process is used for classification in a plurality of local areas in the input image. Then, the results are combined to detect the target object.

In the learning process, a group of different orientation images of a detection target object is prepared in advance. Each image in the group of orientation images contains information, such as a reference position and orientation information of the object displayed therein.

The information can be contained in any format. For example, the reference position of the object is expressed as center position coordinates of the object in the image, and the orientation information of the object is expressed as a rotation matrix.

Figure 2A:
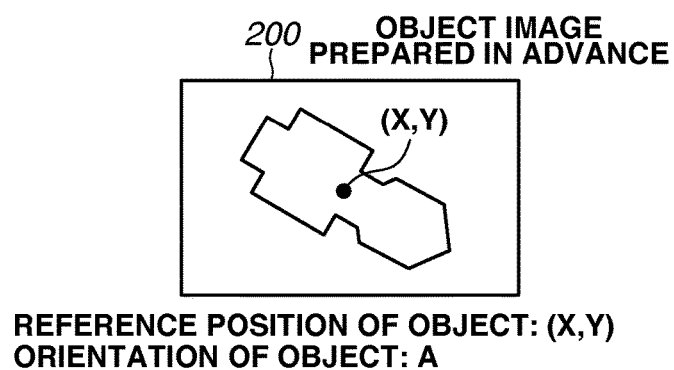
FIGS. 2A, 2B, and 2C are schematic diagrams illustrating an example of an operation for learning processing of Randomized Tree according to the first exemplary embodiment.

An image 200 illustrated in FIG. 2A is one image in the group of prepared orientation images, in which a detection target object is drawn. In the image 200, a single detection target object in an orientation A is drawn. The image 200 contains reference position coordinates (X, Y) and orientation information A of the object.

As the learning images in the learning process, a plurality of partial images is used. The partial images are extracted from all the images included in a plurality of different groups of orientation images of the detection target object. It is assumed that the partial image used herein contains offset information of the detection target object from the reference position in an image as an extraction source, and orientation information of the detection target object in the image as the extraction source.

For example, the offset information can be expressed in a difference between reference position coordinates of an object and the center position coordinates of the partial image.

Figure 2B:
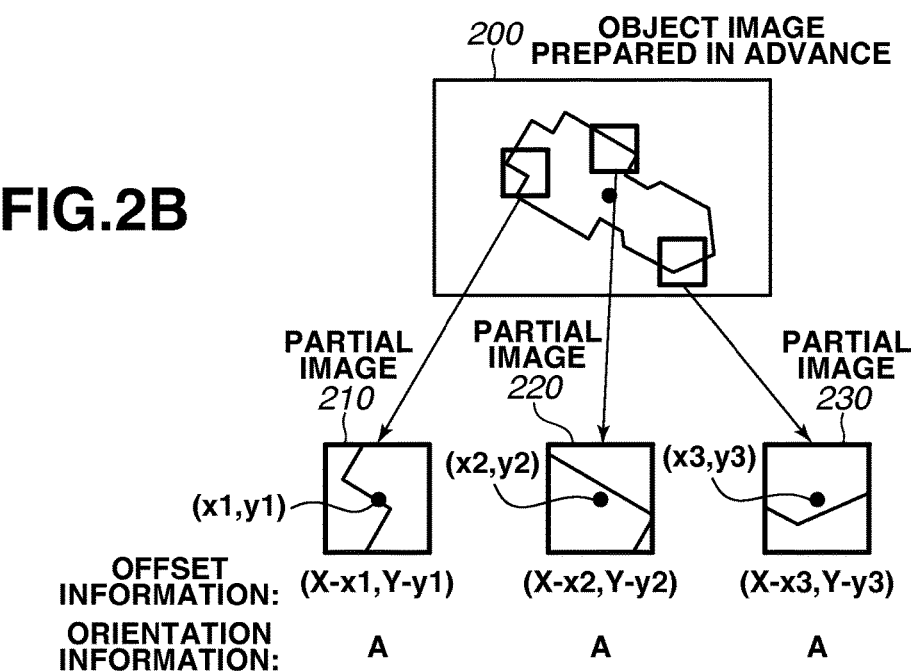

Three partial images 210, 220, and 230 illustrated in FIG. 2B are extracted from the image 200. The partial images 210, 220, and 230 respectively contain offset information pieces (X−x1, Y−y1), (X−x2, Y−y2), and (X−x3, Y−y3) of the detection target object from the reference position, where (x1, y1), (x2, y2), and (x3, y3) are the center position coordinates of the respective partial images 210, 220, and 230.

Each of the partial images 210, 220, and 230 is the image of an area including the detection target object in the orientation A drawn in the image 200, and thus contains A as the orientation information. The set of classification trees is created by using the learning images.

Figure 2C:
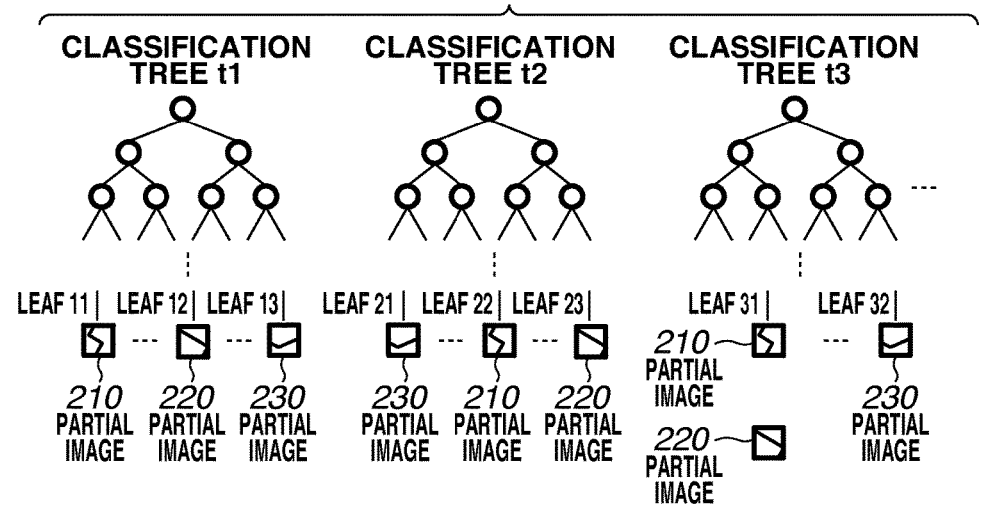

FIG. 2C illustrates how the partial images 210, 220, and 230 are classified in leaves as terminal nodes in each classification tree. In a classification tree t1, the partial images 210, 220, and 230 are classified in different leaves 11, 12, and 13, respectively.

In a classification tree t2, a reference point at each node is different from that in the classification tree t1, and thus the partial images 210, 220, and 230 are classified in leaves different from those in the classification tree t1. Specifically, the partial image 210 is classified in a leaf 22, the partial image 220 is classified in a leaf 23, and the partial image 230 is classified in a leaf 21.

In the classification tree t3, the partial image 210 and the partial image 220 are classified in a same leaf 31, and only the partial image 230 is classified in a leaf 32.

As described above, some leaves store a plurality of learning images, and some leaves store no learning image. All the partial images are classified in leaves in the T classification trees to create the set of classification trees. A learning dictionary 3102 includes coordinate information of the reference point used for comparison in each node in each classification tree and a set of learning image information stored in each leaf.

Figure 3:
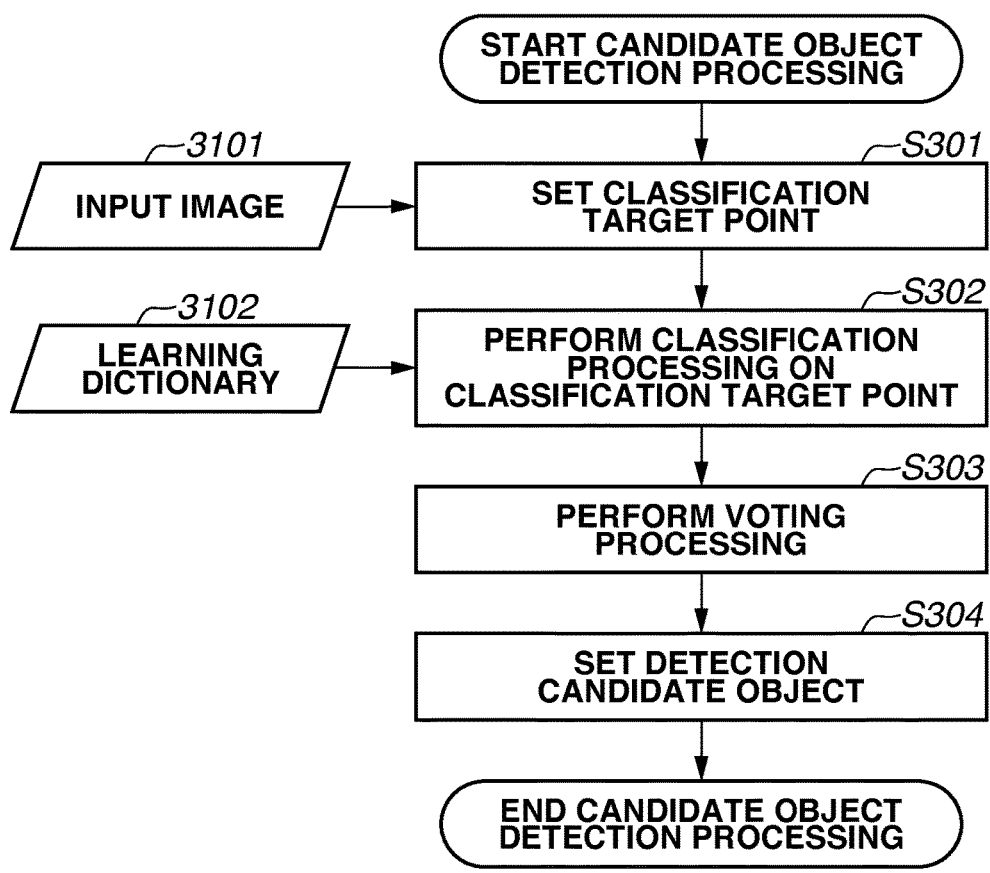
FIG. 3 is a flowchart illustrating candidate object detection processing in the first exemplary embodiment.

The detection processing performed on a plurality of candidate objects by the candidate object detection unit 110 will be described by referring to a flowchart illustrated in FIG. 3 and diagrams and a table illustrated in FIGS. 4A through 4C.

FIG. 4A is a diagram illustrating a part of an input image 3101 obtained by capturing a pile of target objects. In FIG. 4A, an object WB overlaps an object WA, and thus the object WA is partially occluded by the object WB. A part of the object WB is out of the image. Detection of a detection candidate object from the image illustrated in FIG. 4A is described as an example, with the orientation information of the object WA being the orientation information A.

In step S301, the candidate object detection unit 110 sets classification target points (measurement area(s)) in the input image 3101 including the detection target object. While preferably, all the pixels on the input image are set as the classification target points, sampling may be performed to reduce the calculation amount. The classification target point may be an area including a plurality of pixels.

The detection likelihood calculation unit 120 calculates a detection likelihood in each local area, by using a voting result in each classification target point thus set. To simplify the description, only classification target points 411 and 412 illustrated in FIG. 4A are described.

In step S302, the candidate object detection unit 110 classifies all the classification target points set in step S301, in leaves of the set of the classification trees, by using the learning dictionary 3102. FIG. 4B is a table indicating classification results of the classification target points 411 and 412 in the classification trees t1, t2, and t3 illustrated in FIG. 2C.

The classification target point 411 is similar to the partial image 210 illustrated in FIG. 2B, and thus is classified in the leaf 11, the leaf 22, and the leaf 31, to which the partial image 210 belongs, in the respective classification trees.

The classification target point 412 is similar to the partial image 220 illustrated in FIG. 2B, and thus is classified in the leaf 12 to which the partial image 220 belongs, in the classification tree t1. However, in the classification tree t2, the classification target point 412 is incorrectly classified in the leaf 21, which is different from the leaf 23 to which the partial image 220 belongs. In the classification tree t3, the partial images 210 and 220 are classified in the same leaf 31, and thus the classification target points 411 and 412 are classified in the same leaf 31.

In step S303, voting processing (estimation) is performed. Specifically, each classification target point casts a vote for the orientation information to the offset position contained in the learning images classified in the leaves in each classification tree.

The learning image included in the leaf of each classification tree contains the orientation information of the detection target object and the offset information of the detection target object from the reference position included in an image to which each partial image belongs.

Thus, in the voting processing, the reference position of a target object in a certain orientation is supposed to get the largest amount of votes from the partial images in the image of the certain orientation.

The voting performed by the classification target points 411 and 412 is illustrated in FIG. 4C, in response to the result illustrated in FIG. 2B.

In the voting based on the classification tree t1, the classification target points 411 and 412 cast votes to an object fiducial point 413 for the orientation information A, based on the offset information and the orientation information contained in the respective partial images 210 and 220.

In the voting based on the classification tree t2, the classification target point 411 casts a vote to the object fiducial point 413 for the orientation information A. The classification target point 412, on the other hand, refers to the information on the partial image 230 belonging to the leaf 21, and thus casts a votes to a different point 414 for the orientation information A.

In the voting based on the classification tree t3, both of the classification target points 411 and 412 refer to the information on the partial images 210 and 220 belonging to the leaf 31. Thus, the classification target point 411 casts a vote to the object fiducial point 413 and a point 415, whereas the classification target point 412 casts a vote to the object fiducial point 413 and a point 416. Thus, each of the classification target points 411 and 412 casts votes to two points for the orientation information A.

As described above, all the classification target points perform the voting processing based on each of T classification trees.

In step S304, the candidate object detection unit 110 counts the vote for each pixel in the input image, and determines the pixel with the largest number of votes as the detection position of the detection candidate object, and determines the orientation information having received votes as the orientation of the detection target object. Then, the candidate object detection unit 110 outputs the information on the position and orientation of the detection candidate object.

In FIG. 4C, for example, the object fiducial point 413 receives five votes for the orientation information A, and each of the points 414, 415, and 416 receives one vote for the orientation information A. Thus, the object in the orientation A is detected (identified) at the position of the fiducial point 413 with the largest number of votes.

The number of detection candidate object to be output is not limited to one. A predetermined number of detection target objects may be output, or a threshold regarding the number of votes by pixels may be set to determine the detection candidate object to be output.

Through the processes described above, positions and orientations of a plurality of detection candidate objects can be acquired from an input image. The detection method used by the candidate object detection unit 110 is not necessarily limited to Randomized Tree. A detection candidate object may be detected by using any existing detection method.

Next, processing performed by the detection likelihood calculation unit 120 will be described by referring to a flowchart illustrated in FIG. 5 and diagrams illustrated in FIG. 7.

The candidate object detection unit 110 outputs the position and orientation of the detection candidate object, based on the voting by each classification target point. In such a method, when a detection candidate object is partially occluded and thus no vote is received from classification target points in the occluded area, the detection candidate object might be detected if a large amount of votes is obtained from other classification target points.

According to the present exemplary embodiment, a detected detection candidate object is further evaluated with a different index. Thus, throughout the entire area of the objects, the detection candidate object received votes is preferentially presented.

The detection likelihood calculation unit 120 executes processes in steps S501 to S503 described below, on all the detection target objects detected by the candidate object detection unit 110.

As an example of specific processing, the following case is described. Specifically, in the input image 3101 illustrated in FIG. 4A, the object WA is detected as the detection candidate object with the orientation information of the object WA, the object WB, and other objects being the orientation information A, the orientation information B and the orientation information C and D, respectively.

First, in step S501, the detection likelihood calculation unit 120 sets divided partial area information to the detection candidate object. The divided partial area information may be set, after the detection candidate objects are detected, to an orientation image prepared in advance corresponding to each detection candidate object. Alternatively, the divided partial area information may be set in advance for all of a plurality of different orientation images of a detection target object prepared in advance.

The divided partial areas are set to cover the entire area of the detection target object in each orientation image. Preferably, the number of divided partial areas is approximately the same among the objects in all the orientations.

Figure 6:
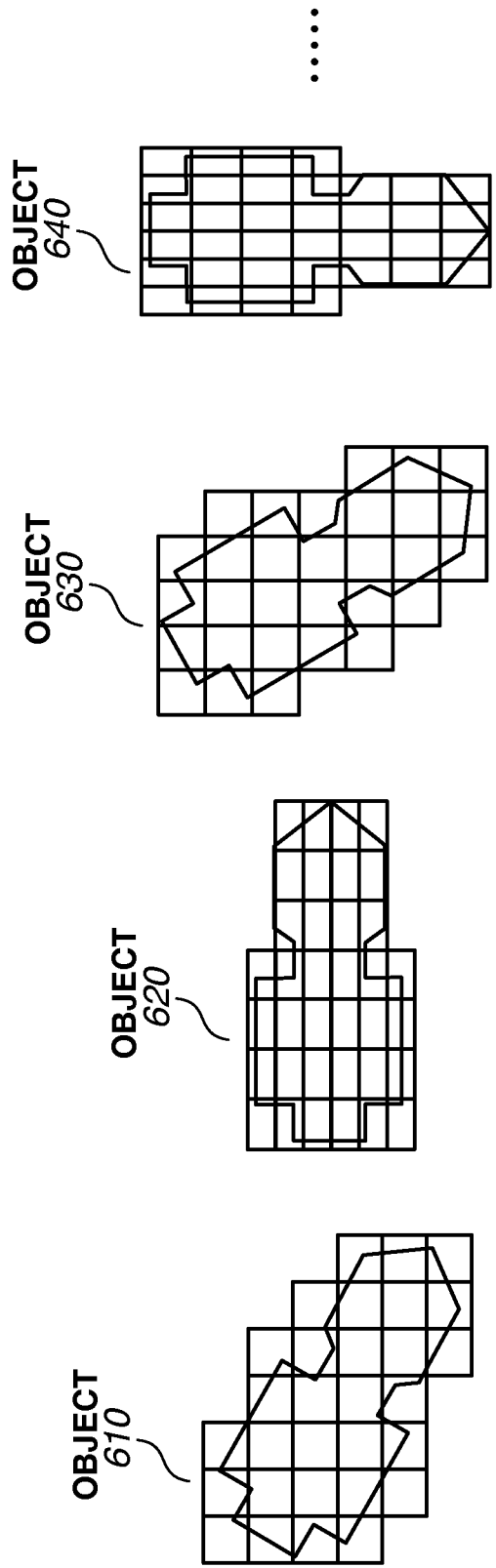
FIG. 6 is a schematic diagram illustrating examples of divided partial areas according to the first exemplary embodiment.

FIG. 6 is a diagram illustrating examples of divided partial areas created for a plurality of orientation images prepared in advance. As illustrated in FIG. 6, each of objects 610, 620, 630, and 640 in different orientations is divided into rectangular areas in a form of a grid.

Each of the objects 610 through 640 in all the orientations are divided into around 30 rectangular areas. Specifically, the objects 610 and 630 are each divided into 30 rectangular areas, and the objects 620 and 640 are each divided into 33 rectangular areas.

By varying the size of the rectangular area for the object in each orientation, the objects in different orientations are divided into approximately the same number of rectangular areas. The divided partial area information of each orientation of the object includes the number of divided partial areas in each orientation, the size of the divided partial area, and position coordinate information of each divided partial area.

The division into the divided partial areas is not limited to the division into the rectangular areas, and any type of division may be employed as long as the entire surface of the object in each orientation can be covered.

Figure 7A:
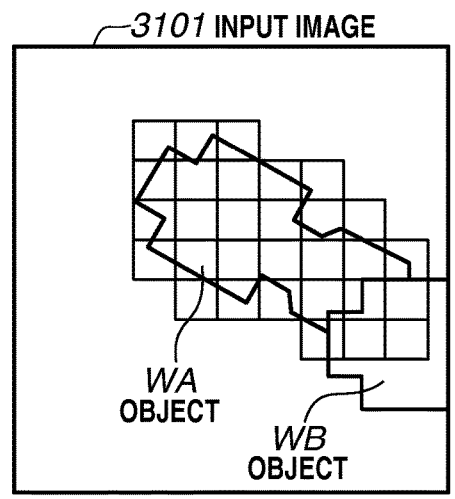
FIGS. 7A, 7B, and 7C are diagrams illustrating an operation for the detection likelihood calculation processing according to the first exemplary embodiment.

FIG. 7A is a diagram illustrating how the divided partial areas are set to the detected detection candidate object WA in the input image 3101 illustrated in FIG. 4A. The divided partial areas set to the object 610 as an object corresponding to the orientation of the object WA are applied. Thus, 30 square areas, each including 2×2 pixels, are set as the divided partial areas of the object WA.

In step S502, the result of voting in step S303 obtained by the candidate object detection unit 110 is referred, and the information for which each classification target point has casted a vote is then acquired as the orientation information having received votes from each classification target point.

The classification target point having the orientation information matching with the orientation of the detection candidate object is likely to be a point on the surface of the detection candidate object.

On the other hand, the classification target point having the orientation information not matching with the orientation of the detection candidate object is likely to be a point that does not contribute to the detection of the object. Such a classification target point is likely to be a point where the detection candidate object is not appropriately visible, due to reasons, such as overlapping with another object, and being under inappropriate illumination.

Figure 7B:
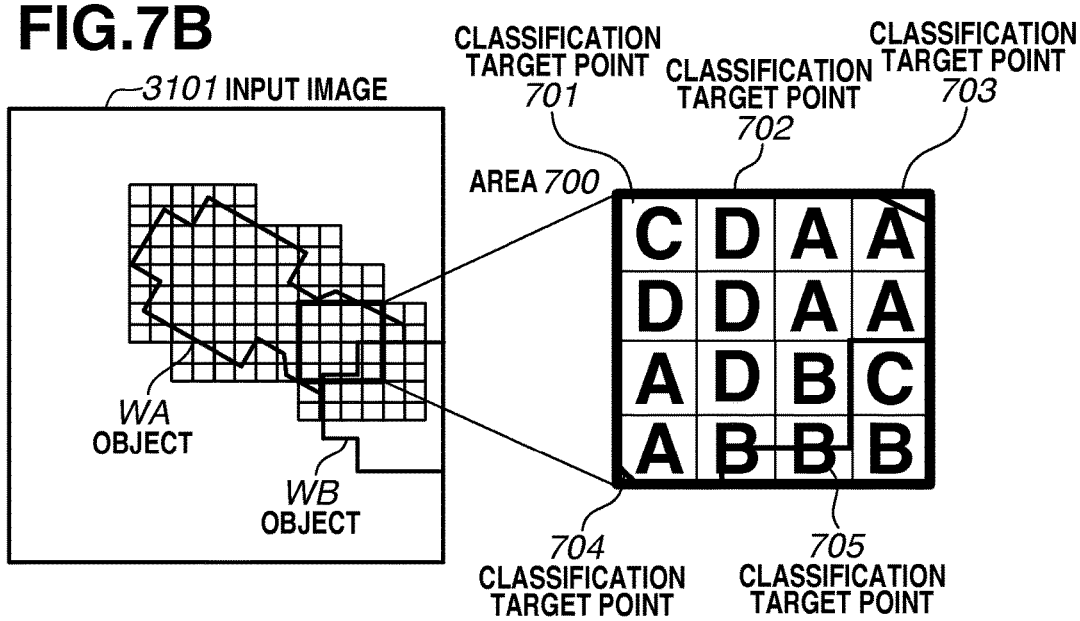

FIG. 7B is a schematic diagram illustrating the result of acquiring the orientation information for which each classification target point on the divided partial area of the object WA in step S502 has casted a vote. All the pixels on the input image are the classification target points.

To simplify the illustration, the orientation information for which each classification target point in an area 700 has casted a vote as a part of the input image 3101 is described on the classification target point.

For example, it can be seen that the classification target points 703 and 704 on the object WA have casted votes for the orientation information A which is the correct orientation information of the object WA. Similarly, the classification target point 705 on the object WB has casted a vote for the orientation information B which is the correct orientation information of the object WB.

The classification target points 701 and 702, which are the points on the object WA, have casted votes for the incorrect orientation information C and the incorrect orientation information D. As described above, the orientation information for which each classification target point on the divided partial areas of the object WA has casted a vote is acquired.

In step S503, the orientation information for which each classification target point acquired in step S502 has casted a vote is referred, for each divided partial area set in step S501. Then, 0 or 1 is set as a detection contribution degree of each divided partial area, based on whether the divided partial area includes a classification target point that has casted a vote for the detected orientation.

Figure 7C:
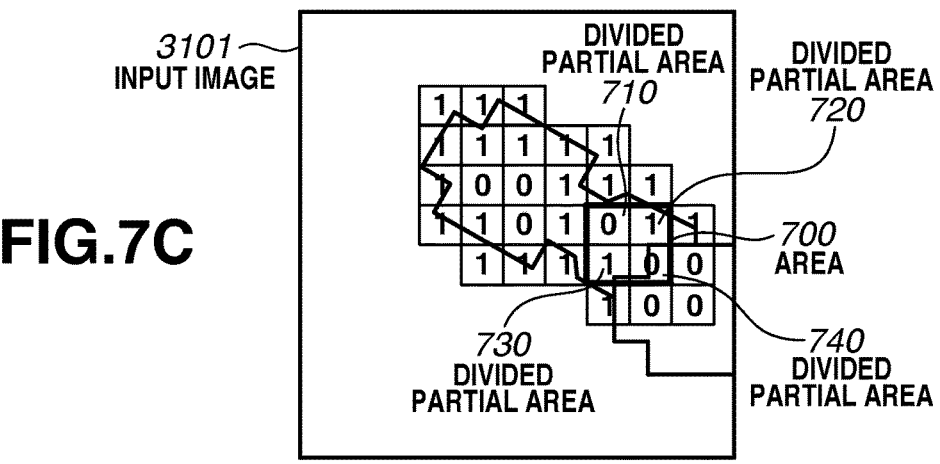

FIG. 7C is a schematic diagram illustrating the result of setting the detection contribution degree of each divided partial areas, based on whether the divided partial area includes a classification target point that has casted the vote for the orientation information A. The detection contribution degree of the divided partial area including a classification target point that has casted the vote for the orientation information A, is set to 1, and the detection contribution degree of the divided partial area including no classification target point that has casted the vote for the orientation information A, is set to 0.

For example, as illustrated in FIG. 7B, all the four classification target points in the divided partial area 720 have casted the votes for the orientation information A. Two of the four classification target points in the divided partial area 730 have casted votes correctly for the orientation information A, and the other two have incorrectly casted votes for the orientation information B and the orientation information D.

However, the divided partial areas 720 and 730 both include at least one classification target point that has casted the vote for the orientation information A. Thus, the detection contribution degree of each of the divided partial areas 720 and 730 is set to 1.

On the other hand, none of the four classification target points in each of the divided partial areas 710 and 740 has casted the vote for the orientation information A. Thus, the detection contribution degree of each of the divided partial areas 710 and 740 is set to 0.

According to the present exemplary embodiment, the detection contribution degree, set to the value 0 or 1, is the partial area detection likelihood in each divided partial area.

The detection likelihood calculation unit 120 checks whether each partial area, of a target object having the position and orientation already detected, contributes to the detection of the object. Thus, the total number of votes for the correct orientation information is irrelevant, and whether the partial area includes at least one classification target point that has casted the vote for the correct orientation information is checked to calculate the partial area detection likelihood in each partial area.

The number of votes for the correct orientation information for setting the detection contribution degree to 1 is not limited to one, and the detection contribution degree may be set to 1 when the number of the votes for the correct orientation is a certain threshold value or more.

The processing performed by the detection reliability calculation unit 130 will be described. The detection reliability calculation unit 130 calculates a detection reliability of each of the detection candidate objects detected by the candidate object detection unit 110.

The detection reliability is an index for preferentially selecting, from among the detection candidate objects detected by the candidate object detection unit 110, the detection candidate object, which receives votes throughout the entire area.

The detection likelihood calculation unit 120 divides the object area into the plurality of partial areas, and calculates the detection likelihood, based on whether each partial area includes a classification target point that has casted the vote for the correct orientation. Thus, with a larger number of divided partial areas including classification target points that have casted the votes for the correct orientation, it can be assumed that a detection result is obtained based on the votes from a large number of object areas.

Thus, according to the present exemplary embodiment, the detection reliability is calculated based on the sum obtained by adding up the partial area detection likelihood in the each divided partial area, calculated by the detection likelihood calculation unit 120.

A formula for calculating detection reliability E can be expressed as follows:

$$E = \frac{\sum_{i=1}^{N} P_i}{N} (1 \leq i \leq N), \quad (1)$$

where N is the total number of the divided partial areas, and Pi is the partial area detection likelihood in a divided partial area i.

Here, for example, the detection reliability of the object WA illustrated in FIG. 7 is 22 (the sum of the partial area detection likelihoods)/30 (total number of divided partial areas)=0.733. The method for calculating the detection reliability is not limited to Formula 1, and other statistical indexes may be used.

The same processing is performed on all the detection candidate object, and thus the detection reliability of each detection candidate object is calculated.

The information processing apparatus 100 can use the detection reliability calculated by the detection reliability calculation unit 130, to preferentially present an object, from among the detected detection candidate objects, having a higher detection reliability, as a picking target object.

According to the present exemplary embodiment, the candidate object detection unit 110 detects the detection candidate object by using the detection method utilizing Randomized Tree including the voting processing in local areas. The detection likelihood calculation unit 120 uses the voting results to set the detection likelihood for the further evaluation, whereby the detection reliability is calculated at high speed.

In the candidate object detection processing, information on local areas is used for the detection. Thus, detection robust against partial adverse conditions due to factors, such as partial occlusion of a target object and lighting directions, can be achieved.

Furthermore, with the detection likelihood calculation processing, a candidate object that is involved with less partial adverse conditions due to factors, such as partial occlusion by an object other than candidate object and a lighting direction, can be calculated.

According to the present exemplary embodiment, the divided partial areas including the classification target points are set, and the detection likelihood is calculated (obtained) for each divided partial area. However, this should not be construed in a limiting sense. For example, the detection likelihood may be set to classification target point, without setting the divided partial areas. In this case, the contribution of the information on the local voting to the reliability is higher than in the case where the divided partial areas are set. Thus, it would be difficult to evaluate whether the entire surface of the object is visible, but it would be easier to perform the processing.

According to the present exemplary embodiment, the detection using Randomized Tree is described. Alternatively, the candidate object detection unit 110 can use any existing detection method for candidate object detection. The method for calculating the detection likelihood in each divided partial area performed by the detection likelihood detection unit 120, is selected in accordance with the detection method used by the candidate object detection unit 110.

For example, when candidate object detection unit 110 detects the candidate object by template matching, the following processing is performed.

The detection likelihood calculation unit 120 further performs the template matching for each of the created divided partial areas. The partial area detection likelihood of the divided partial area, which matches with an orientation image of the detection candidate object prepared in advance, is set to 1, and the partial area detection likelihood of the divided partial area, which does not match with the orientation image, is set to 0. Then, the detection reliability calculation unit 130 can calculate the detection reliability based on the partial area detection likelihood.

As described above, according to the present exemplary embodiment, from among a plurality of detected objects, one that is appropriately visible as a whole, can be preferentially detected.

Additional embodiments are applicable to detection of something other than an object. For example, when a captured image includes a plurality of persons, a person having his or her entire figure in the image can be detected.

A second exemplary embodiment according will be described. According to the present exemplary embodiment, votes in local areas are weighted based on the orientation information having received votes. Thus, the voting results in the areas with no features can effectively be utilized, whereby more accurate detection reliability can be obtained.

The configuration and the operations of the candidate object detection unit 110 according to the present exemplary embodiment are the same as those of the first exemplary embodiment, and thus will not be described.

The processing performed by the detection likelihood calculation unit 120 according to the present exemplary embodiment will be described by referring to a flowchart illustrated in FIG. 8 and a schematic diagrams illustrated in FIGS. 9A through 9D.

The detection likelihood calculation unit 120 performs processes in steps S801 to S803 described below on all the detection candidate objects detected by the candidate object detection unit 110. Specifically, in the input image 3101 illustrated in FIG. 4A, the object WA is detected as the detection candidate object, with the orientation information of the object WA, the object WB, and other objects being the orientation information A, the orientation information B, and the orientation information C and D, respectively.

In step S801, the divided partial area information is set to the detection candidate object. This process is the same as that in step S501 according to the first exemplary embodiment.

When the image illustrated in FIG. 4A is input and thus received, the area on the object WA is divided in to 30 square areas each including 2×2 pixels as illustrated in FIG. 7A described in the first exemplary embodiment, by using the image of the object in the orientation A prepared in advance. Thus, the divided partial areas of the object WA areas are set. The divided partial areas may be weighted in advance.

For example, edge extraction processing is performed on each of different orientation images, prepared in advance, of the detection target object. Thus, the partial area weight for the partial area detection likelihood of the divided partial area including an edge is set to 1, and the partial area weight for the partial area detection likelihood of the divided partial area including no edge is set to $\alpha$.

Figure 9A:
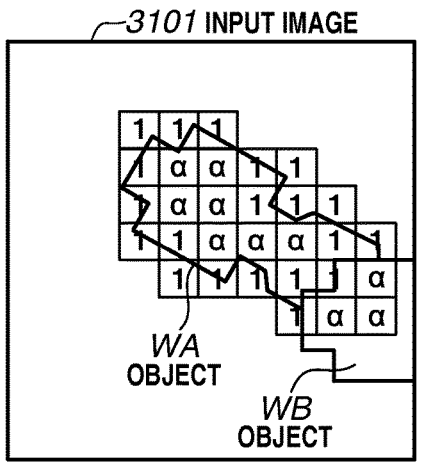
FIGS. 9A, 9B, 9C, and 9D are diagrams illustrating an operation for the detection likelihood calculation processing according to the second exemplary embodiment.

Any value that is larger than 0 and smaller than 1 can be set as $\alpha$. The result of setting the partial area weights for the divided partial areas illustrated in FIG. 7A is illustrated in FIG. 9A.

In step S802, the vote for the orientation information casted from each classification target point on the detection target object is acquired, as in step S502 in the first exemplary embodiment.

The vote for the orientation information of the classification target point includes one of the following three cases: a vote for correct orientation information; a vote for incorrect orientation information; and no vote for orientation information.

The classification target point that has casted no vote for the orientation information is a point without features (on a uniform plane without any textures, for example). Thus, the classified leaves might not include a learning image corresponding to such a point.

Furthermore, there might be a case where a part of the detection candidate object is out of the image, and thus some classification target points in the divided partial area are not in the input image. According to the present exemplary embodiment, the classification target point that has casted no vote for the orientation information is focused.

Figure 9B:
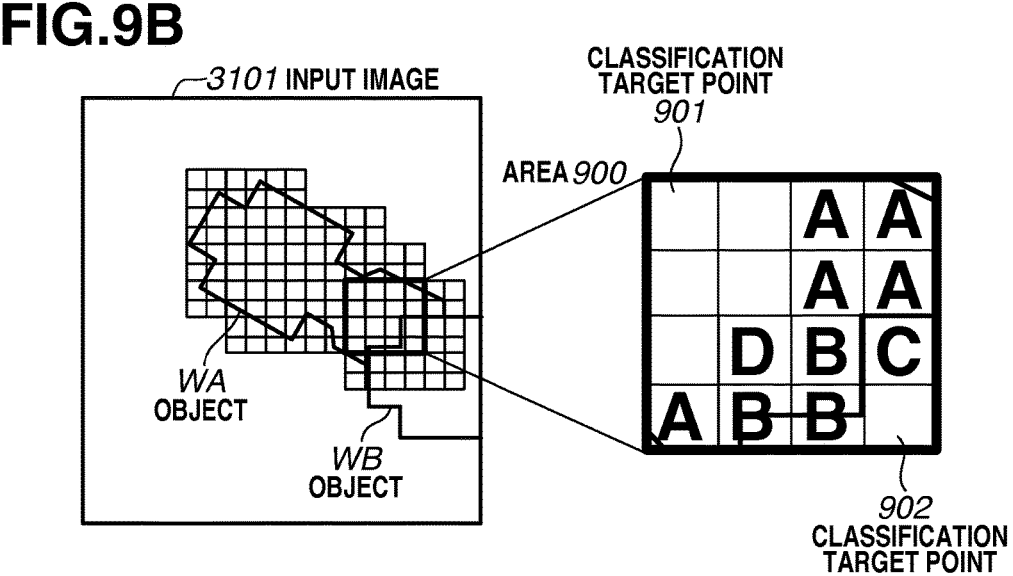

FIG. 9B is a schematic diagram illustrating the acquired result of the votes for the orientation information from each classification target point on the object WA.

All the pixels on the input image are the classification target points. To simplify the illustration, the orientation information having received votes from each classification target point in an area 900 as a part of the input image 3101 is described on the classification point, and the classification point that has casted no vote for the orientation information is illustrated as a blank.

For example, classification target points 901 and 902 are the classification target points that have casted no vote for the orientation information. As described above, the orientation information of each of the classification target points on the divided partial areas of the object WA is acquired.

In step S803, the partial area detection likelihood of each divided partial area is set in accordance with the orientation information having received votes. According to the first exemplary embodiment, whether there is a classification target point that has casted the vote for the correct orientation information is only focused, to set the partial area detection likelihood.

The classification target point casted no vote for the orientation information does not contribute to the detection of the object, but is more likely to be a point on the detection candidate object, compared with the classification target point casted the vote for the incorrect orientation information.

Thus, in step S803, the partial area detection likelihood, of the divided partial area including at least one classification target point that has casted the vote for the correct orientation information, is set to 1.

The partial area detection likelihood of the divided partial area including no classification target point that has casted the vote for the correct orientation information and including at least one classification target point that has casted the vote for the incorrect orientation information, is set to 0.

The partial area detection likelihood of the divided partial area including only the classification target points that have casted no vote for the orientation information is set to $\beta$. Thus, the partial area detection likelihood is set to each divided partial area. Any value that is larger than 0 and smaller than 1 can be set as 13.

When the partial area weight is set to the set divided partial area in advance in step S801, a result of integrating the partial area weight and the partial area detection likelihood of each divided partial area set in step S803 becomes the partial area detection likelihood of each divided partial area.

Figure 9C:
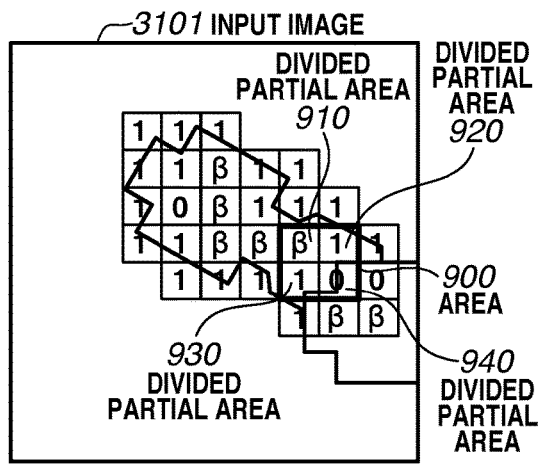

FIG. 9C is a schematic diagram illustrating the result of the partial area detection likelihood set based on the orientation information having received votes in each divided partial area in step S803.

The partial area detection likelihood of each of the divided partial areas 920 and 930 including the classification target point that has casted the vote for the correct orientation information A, is set to 1. The partial area detection likelihood of the divided partial area 940 including no classification target point that has casted the vote for the correct orientation information A and including the classification target point that has casted the vote for the incorrect orientation information, is set to 0.

The partial area detection likelihood of the divided partial area 910 only including the classification points that have casted no vote for the orientation information, is set to $\beta$.

Figure 9D:
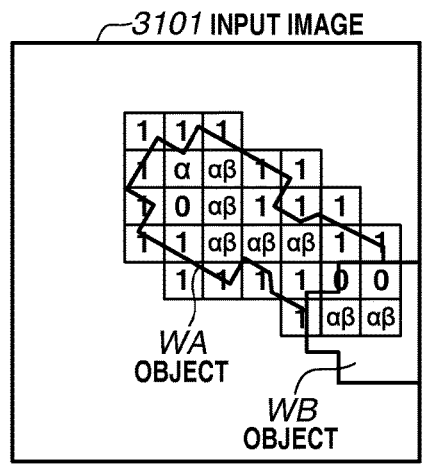

The result of integrating the partial area weight set in FIG. 9A to the partial area detection likelihood set in FIG. 9C is illustrated in FIG. 9D. The result of multiplying the partial area weight with the partial area detection likelihood is finally obtained as the partial area detection likelihood set for each divided partial area.

For example, the partial area weight and partial area detection likelihood of the divided partial area 910 are respectively set to $\alpha$ and $\beta$. Thus, the partial area detection likelihood finally set to the divided partial area 910 is $\alpha \times \beta = \alpha\beta$.

The detection reliability calculation unit 130 calculates the detection reliability for each of the detection candidate objects detected by the candidate object detection unit 110. According to the present exemplary embodiment, the detection reliability is calculated based on the sum of the partial area detection likelihoods in the divided partial areas calculated by the detection likelihood calculation unit 120, as in the first exemplary embodiment.

For example, when α is 0.8 and β is 0.5, the detection reliability of the object WA illustrated in FIGS. 9A through 9D is 22.4 (the sum of partial area detection likelihoods)/30 (the total number of divided partial areas)=0.747.

The same processing is performed for each of the detection candidate object to calculate the detection reliability of each detection candidate object.

When a part of the detection candidate object is out of the input image, and thus some divided partial areas are not on the input image, the divided partial areas out of the image may not be included in the total number of divided partial areas. Thus, the reliability can be prevented from being lower than necessary. The divided partial areas out of the image can also be weighted (with 0.5 for example). Thus, the detection object can be prioritized, with the reliability of the object with the visible surface being the highest, and the reliability of the object, partially out of the input image, being the next highest.

According to the present exemplary embodiment, the partial area detection likelihood is set to the divided partial area in accordance with the orientation information having received votes. Furthermore, the voting result of the classification target point that does not hinder the detection is taken into consideration when the detection reliability is calculated. Thus, more accurate detection reliability can be achieved.

A third exemplary embodiment according will be described.

According to the first and the second exemplary embodiments, the detection reliability is calculated based on the sum of the partial area detection likelihoods. In a case where the target objects WA and WB are detected in an input image 1010 illustrated in FIG. 10, when the sizes of portions, of the target objects WA and WB, occluded by the other object are the same, the detection reliability is likely to be the same between the target objects WA and WB, according to the first exemplary embodiment. However, in actual cases, there is a desired object to be preferentially detected based on the position where the overlapping occurs. For example, the collapsing due to the picking is less serious, in a case where the object WA, having an end area occluded, is selected, compared with a case where the object WB, having the overlapping portion around its center portion, is selected.

According to the present exemplary embodiment, the detection reliability is obtained based on a distributed state of the divided partial areas each including the classification target that has casted the vote for the correct orientation information, and thus the appropriate candidate object is calculated.

The configuration and the operations of the candidate object detection unit 110 and the detection likelihood calculation unit 120 according to the present exemplary embodiment are the same as those of the first and the second exemplary embodiment, and thus will not be described. The detection reliability calculation unit 130 according to the present exemplary embodiment receives, for all detection candidate objects detected by the candidate object detection unit 110, the detection likelihood of each divided partial area of the detection candidate object from the detection likelihood calculation unit 120. FIG. 10B is a diagram illustrating the detection likelihood of each detection candidate object WA and WB in the input image 1010.

The processing performed by the detection reliability calculation unit 130 according to the present exemplary embodiment will be described by referring to a flowchart illustrated in FIG. 11.

The detection reliability calculation unit 130 executes processes in steps 1101 and S1102 described below, on each of the detection candidate objects detected by the candidate object detection unit 110.

In the step S1101, the detection likelihood calculation unit 130 evaluates the distribution state of the divided partial areas, based on the orientation information having received votes in each divided partial area calculated by the detection likelihood calculation unit 120. According to the present exemplary embodiment, each divided partial area contains relative coordinate information and the partial area detection likelihood information thereof as distribution information.

For example, when a position of a divided partial area 1001 is the fiducial point of the object WA in the input image 1010 illustrated in FIG. 10B, the relative coordinate information and the detection likelihood information of the divided partial area 1001 are respectively (0, 0) and 1, whereas the relative coordinate information and the detection likelihood information of a divided partial area 1002 are respectively (3, 2) and 0.

An index V in the following Formula 2 is used as an evaluation value of the divided partial area distribution state:

$$V = \sqrt{\frac{V_x + V_y}{2}}. \quad (2)$$

Here, $$V_x = \frac{1}{N}\sum_{i=1}^{N}\frac{1}{1+(\bar{x}-x_i)^2}, \text{ and} \quad (3)$$

$$V_y = \frac{1}{N}\sum_{i=1}^{N}\frac{1}{1+(\bar{y}-y_i)^2}. \quad (4)$$

Where N is the total number of the divided partial areas, of which the partial area detection likelihood information is 1, $(x_i, y_i)$ is the relative coordinate information of a divided partial area i ($1 \leq i \leq N$) (5)), and ($\bar{x}$ (6), $\bar{y}$ (7)) is the average coordinates of the divided partial areas, of which the partial area detection likelihood information is 1. The score of the evaluation value V is higher when a larger number of divided partial areas, including the classification target point that has casted the vote for the correct orientation information, are around the center of the candidate object. FIG. 10C is a table illustrating a result of evaluating the distribution states of the objects WA and WB.

According to the present exemplary embodiment, the evaluation value V represented in Formula 2 is used for evaluating the distribution state. However, any statistic can be used for evaluating the distribution state. For example, in a case of picking up an object with a picking point determined for each orientation, an object having a small occluded area around the picking point can be preferentially selected by replacing the average coordinates in Formulae 3 and 4 with predetermined relative coordinates of the picking point.

In step S1102, the detection reliability calculation unit 130 calculates the detection reliability based on the distribution information calculated in step S1101 and a distribution reference value obtained from correct distribution information of the detection candidate object.

The distribution reference value is calculated by performing processing, which is similar to that performed on the input image, on the image of an object prepared in advance corresponding to the orientation of the detection candidate object. Specifically, the object image prepared in advance is input to the candidate object detection unit 110, the classification target points are set in step S301, and the classification processing is performed on each classification target point with the learning dictionary in step S302. Then, for the object image prepared in advance, the detection likelihood calculation unit 120 sets the divided partial areas, searches for the orientation information for which each classification target point in the divided partial area has casted a vote, and thus calculates the detection likelihood of each divided partial area. The number and the disposed position of the divided partial areas set herein are the same as those of the divided partial areas set to the detection candidate object detected in the input image. FIG. 12A is a diagram illustrating an object image 1210 that is prepared in advance and corresponds to the orientation of the objects WA and WB illustrated in FIGS. 10A to 10C. FIG. 12B is a diagram illustrating the detection likelihoods calculated for the object image 1210.

The detection reliability calculation unit 130 evaluates the distribution state in step S1101, based on the calculated partial area detection likelihoods of the object image 1210 prepared in advance. The evaluation value thus calculated is set as the distribution reference value. The distribution reference value may be calculated after obtaining the detection candidate object and for the object image corresponding to the orientation of the detection candidate object thus obtained. Alternatively, the distribution reference value may be calculated in advance for all of the prepared object images. FIG. 12C is a table illustrating the distribution reference value of the object image 1210 that is prepared in advance and corresponds to the orientation of the objects WA and WB illustrated in FIGS. 10A to 10C.

The detection reliability calculation unit 130 calculates the detection reliability of each of the detected candidate object by using the evaluation value of the detection candidate object calculated in step S1101 and the distribution reference value. The detection reliability E is expressed by the following Formula 8:

$$E = 1 - |V_L - V| \quad (8),$$

where $V_L$ is the distribution reference value and V is the evaluation value.

For example, detection reliabilities $E_{WA}$ and $E_{WB}$ of the respective detection candidate objects WA and WB are respectively expressed as:

$$E_{WA} = 1 - |0.642 - 0.668| = 0.974 \quad (9)$$

$$E_{WB} = 1 - |0.642 - 0.584| = 0.942 \quad (10).$$

A method for calculating the detection reliability is not limited to Formula 8. The detection reliability may be calculated by any method involving comparison between the distribution reference value and the evaluation value of the distribution state in the detection candidate object.

According to the present exemplary embodiment, the detection reliability is obtained based on the distribution state of the divided partial areas each including the classification target point that has casted the vote for correct orientation information. Thus, the object can be selected while taking into account the position of the occluded area of the candidate object.

According to the above-identified exemplary embodiments, an object having a large appropriately visible area can be selected from a plurality of detection candidate objects in an input image.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-159176 filed Jul. 31, 2013, which is hereby incorporated by reference herein in its entirety.

What is claimed is:

1. An information processing apparatus comprising a processor that functions as:
    an input unit configured to input an image including a plurality of objects;
    a setting unit configured to set a plurality of local areas in the image;
    a position and orientation estimation unit configured to estimate, for each of the plurality of local areas, a position and an orientation of an object, a part of which is included in each of the plurality of local areas;
    a detection unit configured to detect a position and an orientation of the object by integrating respective positions and orientations estimated for the plurality of local areas; and
    an area determination unit configured to determine whether each of local areas in the object has been occluded by another object, by comparing the detected orientation of the object with each of the estimated orientations with respect to the local areas in the object,
    wherein the area determination unit obtains a likelihood for each of the local areas corresponding to the object, based on the orientation of the object estimated for each of the local areas corresponding to the detected orientation of the object, and determines each area based on the obtained likelihoods.

2. The information processing apparatus according to claim 1, wherein the area determination unit adds up the likelihoods obtained for each of the local areas corresponding to the object and determines each area based on a sum of the likelihoods.

3. The information processing apparatus according to claim 1, wherein the area determination unit weighs and adds the likelihood for each of the local areas corresponding to the object according to a position of each of the local areas, and determines each area based on a sum of the likelihoods.

4. The information processing apparatus according to claim 3, wherein the area determination unit sets a weight for a local area, including an edge of the object to be higher than a weight of a local area not including the edge.

5. The information processing apparatus according to claim 1, wherein the area determination unit calculates a distribution of the likelihood obtained for, each of the local areas corresponding to the object and determines each area based on the calculated distribution of the likelihoods.

6. The information processing apparatus according to claim 1, wherein the detection unit detects the orientation of the object using template matching or a determination tree.

7. The information processing apparatus according to claim 1, wherein the area determination unit is further configured to obtain the likelihood based on a number in which the estimated orientation in each of the plurality of local areas is consistent in a number with the orientations of the object detected by the detection unit.

8. An information processing method comprising:
inputting an image including a plurality of objects;
setting a plurality of local areas in the image;
estimating, for each of the plurality of local areas, a position and an orientation of an object, a part of which is included in each of the plurality of local areas;
detecting a position and an orientation of the object by integrating respective positions and orientations estimated for the plurality of local areas;
determining whether each of local areas in the object has been occluded by another object, by comparing the detected orientation of the object with each of the estimated orientations with respect to the local areas in the object; and
obtaining a likelihood for each of the local areas corresponding to the object, based on the orientation of the object estimated for each of the local areas corresponding to the detected orientation of the object, and determining each area based on the obtained likelihoods.

9. A non-transitory storage medium storing a program for causing a computer to execute an information processing method comprising:
inputting an image including a plurality of objects;
setting a plurality of local areas in the image;
estimating, for each of the plurality of local areas, a position and an orientation of an object, a part of which is included in each of the plurality of local areas;
detecting a position and an orientation of the object by integrating respective positions and orientations estimated for the plurality of local areas;
determining whether each of local areas in the object has been occluded by another object, by comparing the detected orientation of the object with each of the estimated orientations with respect to the local areas in the object; and
obtaining a likelihood for each of the local areas corresponding to the object, based on the orientation of the object estimated for each of the local areas corresponding to the detected orientation of the object, and determining each area based on the obtained likelihoods.

* * * * *